COMPACTOR

Original Filed June 14, 1967 4 Sheets-Sheet 1

INVENTOR
KARL W. JERNSTROM
BY
Sol B. Wiener
ATTORNEY

COMPACTOR

Original Filed June 14, 1967 4 Sheets-Sheet 2

INVENTOR
KARL W. JERNSTROM
BY

Sol B. Wiener
ATTORNEY

COMPACTOR

Original Filed June 14, 1967 4 Sheets-Sheet 3

INVENTOR
KARL W. JERNSTROM
BY
Sol B. Wiczk
ATTORNEY

INVENTOR
KARL W. JERNSTROM
BY
Sol B. Wicyk
ATTORNEY

United States Patent Office

Re. 27,774
Reissued Oct. 2, 1973

27,774
COMPACTOR

Karl W. Jernstrom, P.O. Box 278, 160 Woodport Road, Sparta, N.J. 07871

Original No. 3,460,463, dated Aug. 12, 1969, Ser. No. 646,117, June 14, 1967. Application for reissue Nov. 27, 1970, Ser. No. 93,516
Int. Cl. B30b *1/18*
U.S. Cl. 100—52 24 Claims

Matter enclosed in heavy brackets [ ] appears in the original patent but forms no part of this reissue specification; matter printed in italics indicates the additions made by reissue.

ABSTRACT OF THE DISCLOSURE

Trash compactor structure in which a reciprocating piston is mounted in a drawer and the compacting force is between the piston and the front end of the drawer and the trash is filled by simple opening of the drawer to place the trash to be compacted between the piston and the front end, and servicable by removal of the entire drawer from a framework support.

This invention relates to a trash compactor of improved construction for practical use as a kitchen appliance for compacting of garbage and trash including cans, bottles, and the like.

More particularly, the trash compactor is improved for practical use by having pressuring jaws mounted to compact the trash in the front end of a drawer slidable outwardly of a casing for easy loading with kitchen trash and easy removal of a compacted trash briquet, and forming a rugged rectangular compression chamber when closed.

This device is improved in practical mechanical operation in having a ram horizontally traversed by stationary screw, preferably actuated by recirculating balls motor driven by a rotating nut of great strength and efficiency for this purpose.

The device is improved in ready servicing in that the entire trash press and traverse mechanism is mounted in and removable as a unit with the drawer, whereby the service is readily applied to the totally removable drawer.

The device is also improved from the aspect of economical production in that both the slidable drawer and supporting casing are formed from a framework of easily assembled angle irons.

Other structural advantages will appear from the further description made in conjunction with the drawings in which.

Figure 1:
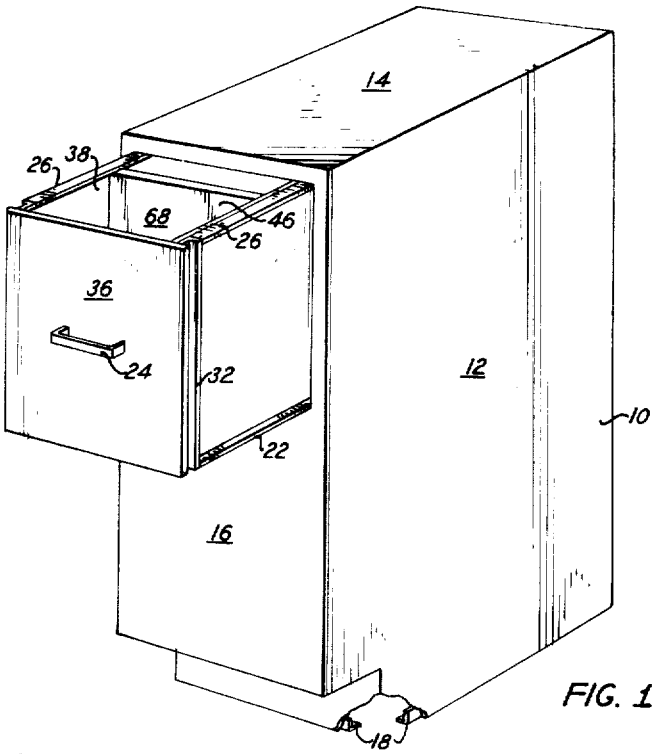
FIG. 1 is an overall perspective of the assembled unit showing the open drawer press and shell housing.
Figure 3:
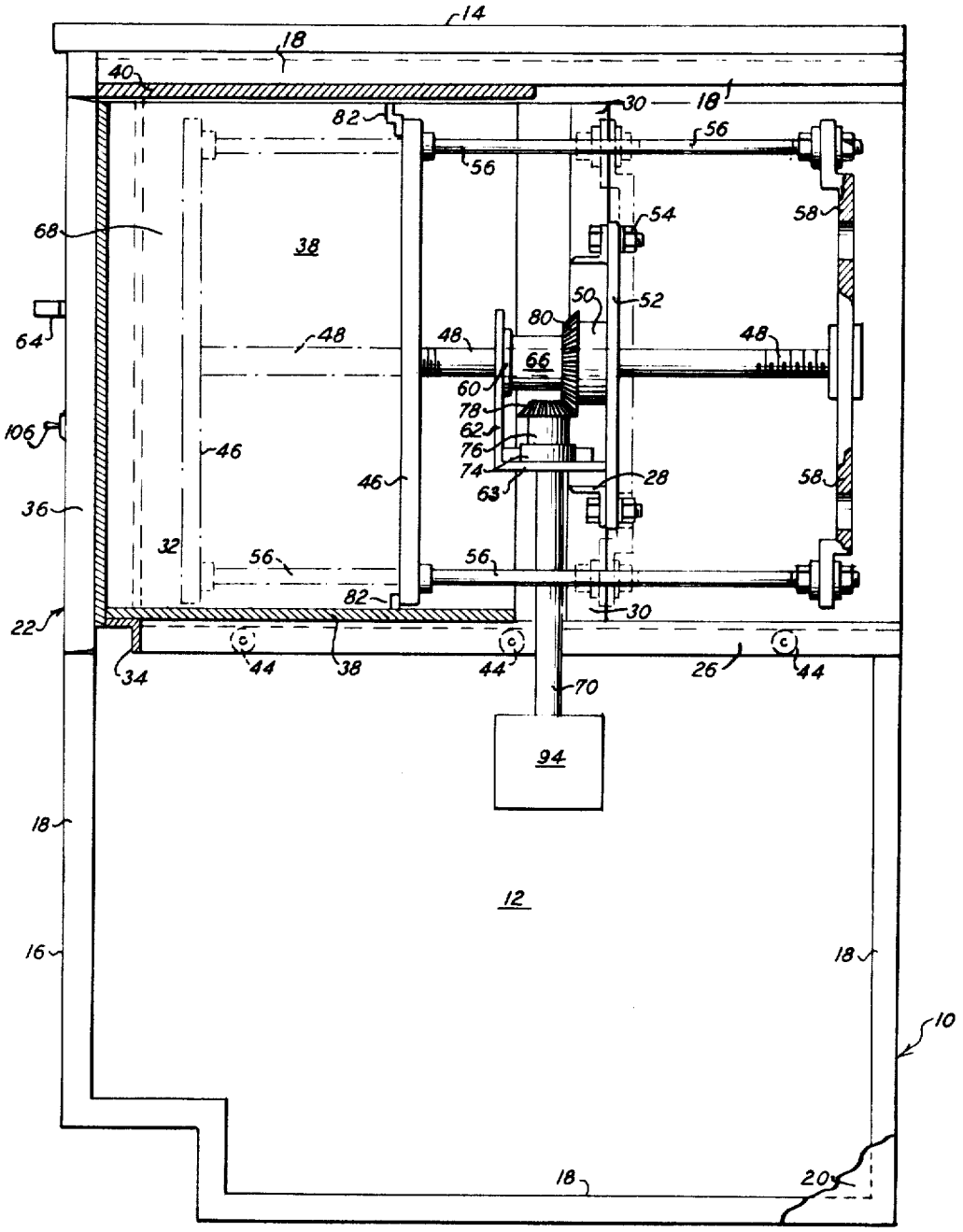
FIG. 3 is a side elevation with parts in section to show the internal construction of the assembled device with the drawer closed, taken through the approximate center of the assembled device as shown in FIG. 1.

As shown in FIG. 1, the commercial form of the device has a rectangular housing 10 comprising sides 12, top 14 and front 16, all of attractively painted or enameled tin plate of usual heavy guage for the purposes;

and supported as shown in FIG. 3, on an angle iron frame 18. The frame 18 preferably is rigidly assembled as by welding. The angle iron as used herein is improved construction for purposes herein of easily constructing the kind of rugged framework needed for a strong press, and is readily enclosed by tin plate sheathing.

A drawer element 22 is mounted for sliding movement in the upper portion of the rectangular closure and is opened and closed manually by a handle 24. The drawer 22 is likewise constructed of an angle iron framework comprising top and bottom angles 26 in each side and running the length of the drawer. The angles 26 are secured together by horizontal intermediate angles 28 and vertical intermediate angle iron bracing elements 30, as well as forward vertical angle iron bracing elements 32, as well as a lower horizontal angle bracing element 34. All of the angles, it will be noted, are arranged with the vertical and horizontal juncture side and angle disposed inward to provide a smooth closed inner end upper surface. The forward angles 32 and 34 are arranged to present a narrow edge forward to receive and have welded thereto a front high pressure resistant anvil plate 36 welded thereto, thus providing both a pressure plate and forward closure of great rigidity and strength to accept the high pressure of the ram for present trash compacting purposes. The forward plate 36 comprises the end surface against which the trash is compacted at extremely high pressure, easily sufficient to break and compress rigid trash objects such as bottles, cans, bones, as often encountered in trash disposal.

The inner U-shaped basket element 38 extends upward along both sides, and covers the bottom of the drawer 22 having its forward end lying against the forward plate 36, and is welded thereto. The top and sides of the basket 38 are welded to fore and aft angles 26, thus completing with the forward plate 36 a heavily reinforced rectangular pressure chamber on both the bottom and sides. An upper plate 40 is also welded horizontally to the upper angles of the frame 18, from side to side of the drawer, and serves as a rugged top plate closure, cooperating with the sides 38 of the U-shaped basket, thus completing as a top closure the enclosure of the rectangular pressure chamber in which the trash is compacted when the drawer is closed, as will appear.

Figure 2:
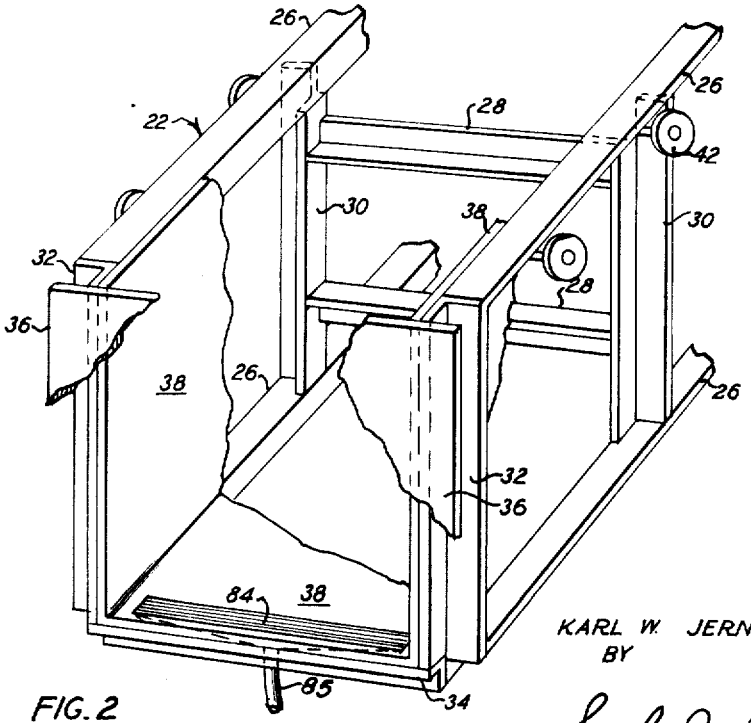
FIG. 2 is a fragmentary detail with parts broken away to show the angle iron framework of the drawer.
Figure 4:
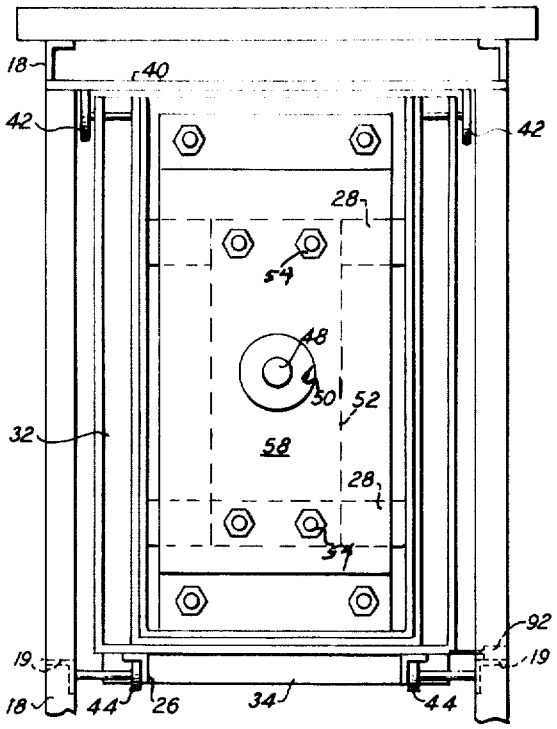
FIG. 4 is a rear view of the assembly with parts in section taken as a rear view of FIG. 3 with the outer metallic sheathing removed to show internal construction.

Extending outward from the upper drawer frame angles 26, symmetrically on both sides, as shown in FIGS. 2 and 4, are rollers 42 which engage the upper plate 40 for guide of the upper end of the drawer 22 in longitudinal sliding movement in the cabinet 10. Extending inward from intermediate side horizontal angles *19* [not shown] at the level of the bottom of the sliding drawer 22, are rollers 44 (*FIGS. 3 and 4*) [FIG. 3] which bear against the underside of the horizontal flange of the lower angle iron 26, for complimentary rolling support of the bottom of the roller drawer 22, so that the drawer 22 slides easily from closed position of FIG. 3 to open position of FIG. 1 by manual pulling of handle member 24. Mounted for horizontal bracing motion within the drawer 22 are bracing angles 28.

As shown in FIG. 3, the upper pressure plate 40 and sides and bottom of the basket 38 terminate at an intermediate point about the center of the drawer 22 between the front plate 36 and the end of the drawer so that the pressure platen or ram 46 will reciprocate from a point behind its full line open trash receiving position; that is, just before the inner end of the basket 38, and the forward completely extended or closed ram position, approximately at dotted line position of FIG. 3.

All of the press assembly integrally supported from angles 28 will move forward as the drawer is opened and is easily removed as part of the drawer with slight tilting motion after the plate 40 is cleared at the front end of the drawer. *In full open-drawer position, the depending shaft 70 and motor 94 engages the front end of the housing so that slight tilting of the drawer is needed for its removal and constitutes a drawer stop.* If desired, easily released latching means (not shown) may be provided to prevent the drawer from coming out completely in ordinary reciprocating horizontal movement, and for ready release when the entire drawer is to be removed from sliding engagement with the angle frame 18 on the rollers 42 and 44. *Such latching means when used will also constitute a drawer stop.*

The press plate itself, as shown in FIG. 3, comprises a ram or pressing head 46 secured to a stationary screw 48 which is supported in anti-friction thrust bearings within a race 50 secured and supported by an after plate 52, both upper and lower ends of which are bolted by bolts 54 to upper and lower cross angles 28 and in turn fastened to intermediate vertical angles 30. A series of four stay rods 56 have their forward ends bolted to four corners of the ram 46 and their after ends to the corners of the frame-like yoke 58, the center of which supports the after end of the ram screw shaft 48. A forward anti-friction bearing 60, also braces the screw shaft 48 and sleeve 66 for free rotation in a vertical bracket arm 62 of an angle bracket, of which the horizontal arm 63 is fastened for ultimate suport to the after plate 52. An internally threaded sleeve 66 supported from the forward end of the race 50 encloses and actuates in rotary motion a ball bearing drive which consists of circulating balls entrained between the threads of sleeve 66 and the threads of the screw drive 48, whereby the rotating sleeve acts as a rotating nut which by rotation and circulation of balls between an inner thread of the shaft 48 and the thread of the sleeve 66 is rotated. The ram plate 46 together with the assembly, including the stay rods 56 and yoke plate 58, thus moves in reciprocating compressing movement to compact trash within the compression chamber 68. A lower vertical shaft 70 coupled to the armature of a motor 94, is supported by a thrust bearing 74 upon the horizontal bracket arm 63 and terminates in a sleeve drive 76 to which is fastened a bevel gear 78 which meshes with a companion horizontally mounted bevel gear 80 fastened to sleeve 66. The rotary drive of the motor 94 through shaft 70 rotates the bevel gears 78 and 80, thereby rotating the rotary sleeve-nut 66fastened to gear 80 causing circulation of the ball bearings 67 therein and imparts reciprocating drive to the screw shaft 48.

Figure 7:
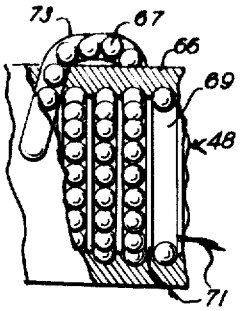
FIG. 7 is a detail showing the structure of FIG. 6 for recirculation of ball bearings.
Figure 6:
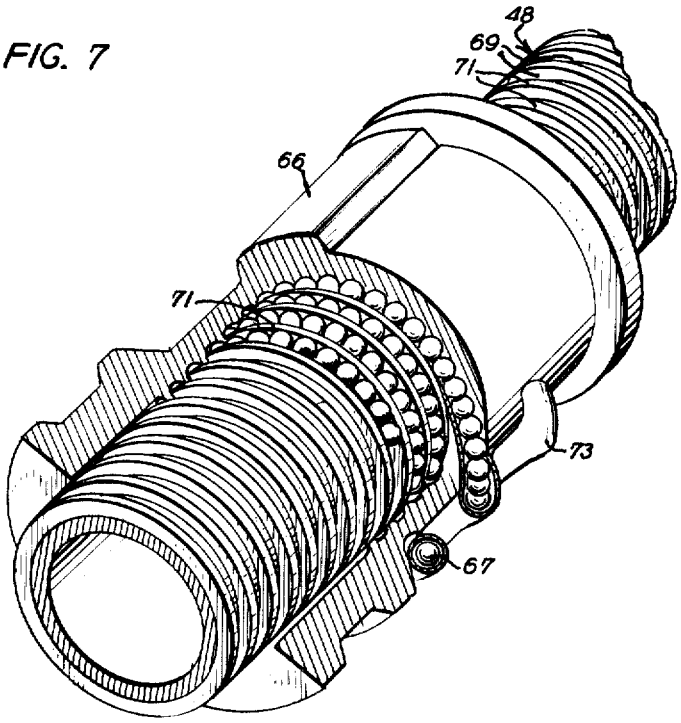
FIG. 6 shows a commercial ball-screw wherein ball bearings are circulated between a nut and screw for frictionless reciprocation of a screw shift by a rotary nut.

As shown in detail in FIGS. 6 and 7, the ball bearing sleeve drive is conventional structure wherein the rotary nut 66 is mounted above the shaft 48 having the threads gouged semicircularly in grooves 69, alternately disposed between helical lands corresponding to screw threads 71 to receive the ball bearings 67. A ball bearing duct 73 is mounted to straddle several threads and to transfer the ball bearings from one of the straddled group of several threads to an opposite end of the group of threads so that during rotation of the nut 66 the ball bearings are removed from one end of the group as the shaft 48 traverses longitudinally out of the distance straddled by the nut and replaces these balls at the opposite entering end. The balls spring to meet and support each new groove entering the nut. This is a known commercial system. It is preferred in the present device in having the advantag of substantial friction reduction, easy stepless control, with little system stiffness and greatly reduces wear despite heavy pressures.

The ram plate 46 has slightly tapered sides from the top to bottom to enhance concentration of the refuse downward. Moreover, the pressing assembly shown of ram plate 46 and yoke plate 58 fastened by stay bars 56 and reciprocated by the screw shaft 48 allows application of even pressure to an unbalanced resistance in the press. All unevenness between the plates 46 and 36 is accommodated resiliently by the stay bars and yoke plate. For these reasons it is preferred that the ram 46 be pressed by the stationary screw 48 slightly below its center; that is, more nearly the center of gravity of the compacted material which is below the center of the pressure plates and which tends in continuous compacting thrusts to become more dense at a point closer to the bottom of the chamber 68. Hence, heavy items such as cans and bottles tend to gravitate downward during multiple compressions and the eccentric placement of the shaft 48 accommodates this by mounting below the center. Moreover, an inequality of resistance encountered in crushing a bottle or can is accommodated resiliently by the stay bars and yoke construction with the ram plate as described. Finally, since liquids and pulpy materials are sometimes present in the compression chamber, it is desirable to fit the outer edges of the ram 46 with a resilient gasketing material 82 to prevent sepage of pulpy and liquid materials outward around the edge of the ram as the trash is being compacted.

It is also useful to emplace a drain 84 in the bottom of the basket 38 covered by a grill through which liquids may be withdrawn from the compression chamber as it is expressed from the compacted mass and led to a sewer by connection with a resilient tube 85.

Figure 5:
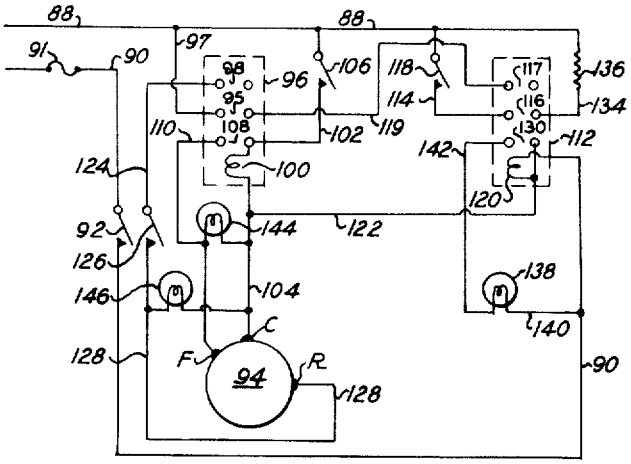
FIG. 5 is a wiring diagram illustrating the hook-up of essential operating units.

The electrical controls are shown in FIG. 5 in which the current enters through lines 88 and 90. Lines 90 may include a fuse 91 and a snap acting switch 92 (FIG. 4). The switch 92 is mounted to be opened by movement of the drawer 22 so that when the drawer is puled open, the switch 92 will automatically break the circuit to motor 94 as will appear. The other line of supply current, line 88, passes to a center contact 95 of a relay 96 by way of line 97. Normally the contacts 95 comprise a relay switch which is in circuit with upper contacts 98. A coil 100 with a magnet (not shown) of relay 96 is also in circuit with input current and motor contact C by way of lines 102 and 104. A manual control switch 106 is conveniently mounted for operation such as on the front face of the drawer plate 36. The relay 96 also has lower contacts 108 in circuit with coil 100 and lines 102 and 104. When the switch 106 is manually closed, energizing the coil 100 and magnet (not shown), the switch arms extending from contacts 95 (not shown) are withdrawn from contacts 98 to alternately close the circuit across contacts 108 which then allows current to pass from line 88 and complete the circuit through the motor 94, passing further by way of line 110 and motor contact F. This is the forward motor connection, and the ram 46 will responsively more forward in the compressing direction under drive of motor 94.

A second sensing relay 112 takes current in part through its center contacts 116 normally having their switch arms extending therefrom (not shown) to close the circuit through contacts 117. Contacts 116 and 95 are then in circuit by way of line 119. The center contacts 116 have one leg in circuit by way of line 114 with input supply line 88 by way of normally closed overload switch 118. Relay 112 has an energizing coil 120 and magnet (not shown) which is in circuit with input leg 90 and controlled by drawer movement switch 92. This relay coil 120 is also in circuit with line 104 by way of line 122, and will not be energized until the current drawn to the motor 94 exceeds a predetermined current value for maximum motor torque which, for a one-third horsepower motor, preferred herein, may be of the order of 4½ amperes. When the motor 94 is running, power will be supplied thereto through contacts 108. When the ram plate 36 is under high compression and reaches a pre-determined maximum compression value, switch 118 is momentarily opened to break the circuit through line 114, and line 119 and switch arms from contacts 95 return again, returning to complete the circuit through contacts 98, transferring the current supply through line 124 and normally closed switch 126, and completing the circuit thereby through line 128 to motor contact R, whereby the circuit then is carried to the motor 94 through lines 122 and 128, contacts C and R, and thus causing the motor to reverse.

When the ram plate 46 has thereby been retracted to a full open position, the ram plate 46 then mechanically trips the switch 126 breaking the circuit to the motor and inactivating the movement of the ram. When the motor torque has become excessive, exceeding the pre-determined 4½ amperes, relay coil 120 activates its magnet to move the switch arms from contacts 117 to place the center contacts 116 in circuit with the lower position contacts 130. This breaks the circuit through line 119 between relays causing the switch of relay 96 to reverse to contacts 98. The motor reverses until it trips the reverse limit switch, opening the circuit to the motor and reactivating the unit. The center contact 116 of relay 112 when making connection with the lower contact 130, after the coil 120 has been energized, is in circuit through line 134 with input current line 88 by way of resistance 136, the latter being so balanced as to drain the same amount of current as required to energize coil 120. This converts the circuit through line 134 to a holding circuit for relay 112 which will be broken except that opening of the drawer 22 breaks the circuit through switch 92 (or manual switch 106). The purpose of this holding circuit is to provide a voltage drop through lamp 138 by way of lines 140 and 142, completing through switch contact 130, thereby interconnecting the circuit from line 88 by way of lines 114, contacts 116 and 130, to the opposite input line 90, and the lamp number 138 will remain illuminated whenever relay 112 is energized and will stay lighted until the drawer is opened to trip switch 92. Consequently, lamp 138 is an indicator of any excess torque requirement of the motor. A lamp 144 is in circuit across lines 110 and 104, indicating that the motor is moving forward; that is, compressing, and a lamp 146 is in circuit across lines 104 and 128 to indicate that the motor is reversing. Each of the switches 126, 106, 118 are momentary contact switches normally opened or closed under the conditions indicated.

As thus described, a household compactor for refuse is provided wherein the entire compacting unit is mounted in a slidable drawer. The slidable drawer may be opened slidingly to expose the compression chamber for filling with trash into the open drawer as a compacting chamber. Upon closing the drawer, a pressure ram compacts the trash efficiently and with great pre-set pressure, sufficient to compact all normally-encountered household refuse even to crushing and compacting.

The design is such that the forward end of the drawer when opened disposes for filling a normal compacting portion to receive additional portions of trash, and when closed the compacting piston or ram automatically compresses the trash, pressing forward against a front stationary plate or anvil. Thereby the device becomes easily accessible both for supplying additional trash to be compacted or for removal of the compacted mass as a compressed body such as in the form of a briquette or the like, which is easily removed and easily disposable. If desired the empty compression chamber may have inserted a paper container such as a bag, sack, carton or the like and opened to resiliently fill the compression chamber and into which the refuse is placed and the filled sack is then pressed and compacted with the trash disposed within, so that upon removal the container and its compressed contents are removed and easily disposed of as a compacted dry unit.

The construction described further has the advantage that the entire drawer is removable together with the compacting elements for ready repair, cleaning, or the like, as a portable unit.

Certain auxiliary features are desirable in a press of this character, and may be included. For instance, it is useful to provide a drain as shown in the drawing as element 84 in the bottom of the basket 38 which serves for continuous removal of expressed fluids. The drain 84 may be fitted with ducting 85 to transport the expressed fluid to a disposal sewer (not shown). Such drain may extend as shown substantially from side to side of the drawer and is disposed preferably in the forward end of the compression chamber to receive expressed fluids even from narrow compacted masses. It is preferred that the drain be protected by a screen or grill to avoid clogging of the ducting with solids.

Several improved structural features are shown herein. For instance, the rectangular ram plate 46 has resilient blades 82 mounted upon its peripheral edges which may be of typical rubber gasketing wiper material to prevent, as a seal, substantial exudation or flow of fluids or wet pulpy materials about the edges of the moving ram. In addition, the seals 82 prevent expelled fluids from accumulating in back of the ram which accumulation could otherwise contaminate the machinery and pose an odor problem. The gasketing seal 82 further allows the compression chamber to be washed free of residual contaminating fluids or solids after removal of the compacted trash body, while inhibiting passage of fluid into the operating elements behind the ram plate.

Another important feature of the present construction is the total easily assembled angle iron structure which provides adequate stiffening for a press of great strength for rugged long use providing a strong bracing frame for support of an easily sliding drawer with roller elements thereon.

A further feature hereof is in the provision of a basket element forming a liner for the compression chamber readily removable after substantial wear and easily assembled upon the stiffening angle iron framework to form most of the compression chamber. An enclosure element forms the upper plate completing the walls of the compression chamber when the drawer is closed, forming a fourth wall closure of the U-shaped basket, whereby a rugged, easily-emplaced compression chamber is provided for easy operation of the unit.

The motor driven ram mechanism may be, as described, a typical rotary nut whose rotation effects reciprocation of the screw shaft and ram assembly attached thereto. Such reciprocation may obviously also be by direct screw threaded contact between the threaded rotary sleeve 66 and the shaft 48; but as indicated, great efficiency is provided by the recirculating ball screw and nut construction, a mechanical element readily commercially available of greatly improved efficiency and little friction, whereby optimum compression is available from a moderately powered electrical motor drive as shown.

The motor drive 72 may also be hydraulically driven as a hydraulic motor as may be preferred in some units. While it is preferred to use the screw and ball bearing units, as stated, for the smaller size units it is sometimes useful to substitute a piston type of reciprocating actuator which is usually extended and retracted hydraulically. However, it could be operated by pneumatic pressure as well.

While the ram is mounted upon a screw threaded shaft for applying compression thereto which reciprocates as described but does not rotate, it is also possible to rotate the screw threaded shaft 48 for reciprocation thereof.

As described with respect to the operating electric circuitry, the various safety features for disconnecting the circuit to the motor when the drawer is open or when overloaded, are provided, whereby a very practical operating unit is formed.

The problems encountered in this kind of construction include the possibility of eccentric loading on the ram plate resulting sometime when a bottle or can is disposed during the compression at the bottom or at an edge of the compression plate, and because of the often small clearance between the edges of the ram plate and the surrounding compression chamber walls, and the desire to eliminate the need of wall guides, as are commonly used in reciprocating engines, ram suspension system is here provided whereby instead of the ram plate being pushed by the screw with all of the compression force and the corners of the yoke plate being applied from its centerpoint, the ram plate rather is pushed through stay bars from the rear of the screw shaft. Thus, the screw shaft actually pulls the stay bars to create a compression or pushing effect applied at the plate edges while compressing the trash. The effect of pushing the ram plate from the rear results in the toleration of substantial eccentric forces being applied to the trash during compression without distorting the ram plate itself or causing its jamming against the compression walls. A second advantage of the rear push construction shown for the ram plate is that it needs provision of only two journals or bearing supports for the threaded compression shaft, one near the front and another near the rear of the long screw, so that the screw is cantilever loaded, but becomes a simple beam loading, and that in effect is the reason why jamming is prevented.

As thus described certain modifications will occur to those skilled in the art and, accordingly, it is intended that the description and drawings set forth be regarded as illustrative and not limiting except as defined in the claims appended hereto.

What is claimed is:

1. A trash compacting device comprising a housing, a drawer mounted to slide outward from an enclosed position in said housing, and having an open top to receive trash in open drawer position, said open top being covered by said housing in closed drawer position, said drawer having a pressure resistant forward plate, drawer sides and bottom fastened to and adjoining said forward plate and forming with the housing a compression chamber in closed position of said drawer in said housing, a movable piston mounted to reciprocate in said drawer and compress trash filled in said compression chamber between the piston and said forward plate, and means for reciprocating said piston to compact the trash in said compression chamber aganist said forward plate.

2. The device as defined in claim 1 wherein the means for reciprocating said piston is mounted in said slidable drawer and is entirely removable with said drawer from said housing.

3. The device defined in claim 1 wherein said housing comprises a sheathed framework formed of angle irons secured together to support and form guideways in which said drawer is housed and slidingly supported, said framework having a top plate pressure resistant closure element disposed immediately above the drawer top as a compression chamber closure for the open top of said drawer when in closed position in said housing.

4. The device as defined in claim 1 wherein the drawer is rectangular and the piston is rectangularly fitted in the rectangular pressure chamber formed therein.

5. The device as defined in claim 4 wherein the rectangular piston has a resilient sealing means disposed about its edges sealing the piston against the walls of said compression chamber.

6. The device as defined in claim 1 wherein the means for reciprocating said piston is a motor driven helically threaded screw.

7. The device as defined in claim 1 wherein the means for reciprocating said piston is a helically threaded stationary screw having a motor driven threaded rotary nut, said nut and screw having continuously circulating balls mounted in the threads as a force transfer medium between said threaded nut and screw.

8. The device as defined in claim 1 wherein the compression chamber is rectangular, the piston is a rectangular plate and comprises a rectangular yoke plate fastened thereto by stay rods extending between corresponding corners, a helically threaded stationary screw substantially centrally disposed between said compression plate and yoke, and cooperative threaded means for reciprocating said threade screw and compression plate.

9. In a trash compactor comprising a compacting chamber for trash and a trash compacting ram plate mounted to reciprocate therein, said ram plate having several stay bars evenly distributed about the periphery thereof, and secured together at an opposite end in a yoke plate, and means for reciprocating said ram plate drivingly connected to said yoke whereby to apply even pressing force from the peripheral edges thereof, through said stay bars.

10. The device as defined in claim 9 wherein the ram plate and compression chamber are rectangular and the vertical sides are tapered from top to bottom.

11. The device as defined in claim 9 wherein the means for reciprocating the ram is a threaded shaft fastened between the ram plate and yoke, and the ram thrust is derived indirectly by reciprocating force applied to said yoke and transferred to said ram from said stay bars.

*12. A trash compacting device comprising a housing, a drawer in said housing, separate bars mounted longitudinally of said drawer, said separate bars guiding said drawer at opposite sides thereof in sliding movement within said housing and roller means between said drawer and said housing engaging said bars, a front portion of said housing forming a stop means to prevent inadvertent removal of said drawer in normal sliding use to compact trash, said drawer having a portion extending outward of said housing to expose an open top to receive trash in open-drawer position, said open top being covered by said housing in closed-drawer position, said drawer having pressure resistant forward, side and bottom plates adjoining each other and integrally forming a rigid compression-resistant chamber in the forward end of said drawer, a movable piston mounted to reciprocate in said housing and compress trash filled in said compression chamber and means for reciprocating said piston.*

*13. The device as defined in claim 12 wherein the means for reciprocating said piston is mounted in said slidable drawer and is entirely removable with said drawer from said housing.*

*14. The device defined in claim 12 wherein said housing comprises a sheathed framework formed of angle irons secured together to support and form guideways in which said drawer is housed and slidingly supported, said framework having a top plate pressure resistant closure element disposed immediately above the drawer top as a compression chamber closure for the open top of said drawer when in closed position in said housing.*

*15. The device as defined in claim 12 wherein the drawer is rectangular and the piston is rectangularly fitted in the rectangular pressure chamber formed therein.*

*16. The device as defined in claim 15 wherein the rectangular piston has a resilient sealing means disposed about its edges sealing the piston against the walls of said compression chamber.*

*17. The device as defined in claim 12 wherein the means for reciprocating said piston is a motor driven helically threaded screw.*

*18. The device as defined in claim 12 wherein the means for reciprocating said piston is a helically threaded stationary screw having a motor driven threaded rotary nut, said nut and screw having continuously circulating balls mounted in the threads as a force transfer medium between said threaded nut and screw.*

*19. The device as defined in claim 12 wherein the compression chamber is rectangular, the piston is a rectangular plate and comprises a rectangular yoke plate fastened thereto by stay rods extending between corresponding corners, a helically threaded stationary screw substantially centrally disposed between said compression plate and yoke, and cooperative threaded means for reciprocating said threaded screw and compression plate.*

*20. A trash compacting device, a drawer slidable into and out of said housing having a compression chamber in the forward end formed by the walls and bottom of said drawer as defined in claim 12 wherein said piston comprises a compacting ram plate mounted in said housing to reciprocate and compress trash in said chamber, said ram*

*plate being reinforced by stiffening members disposed angularly about the periphery thereof, and means for applying force through said stiffening members to the ram plate for reciprocating said ram plate, whereby to apply even pressing force upon the peripheral edges of said ram plate.*

*21. A trash compacting device as defined in claim 12 wherein said reciprocating means includes means for limiting the pressing force applied by said reciprocating means whereby upon exceeding limiting pressure applied thereto in compacting of said trash said reciprocating means will be inactivated, said means for limiting the pressing force applied by said reciprocating means including means for measuring the compressing force and terminating said compressing force applied to said reciprocating means upon exceeding a pre-set quantity of force.*

*22. The device as defined in claim 21 wherein said reciprocating means includes an electric motor drivingly connected to impart reciprocating motion to said piston, and an electric power supply in circuit with said motor, said power supply including overload switching means operative to interrupt the current flow to said motor when a condition of overload pressure is exceeded by said reciprocating means.*

*23. The device as defined in claim 21 wherein said reciprocating means includes an electric motor drivingly connected to impart reciprocating motion to said piston, and an electric power supply in circuit with said motor, said power supply means including switch means operative to change the compressing drive of said reciprocating means to terminate compacting pressure of said piston upon said trash to a reverse drive of said reciprocating means withdrawing said piston from pressing contact upon said trash.*

*24. A trash compacting device comprising a housing, a drawer in said housing to slide outward from a closed drawer position in said housing, separate bars mounted longitudinally of said drawer, said separate bars guiding said drawer at opposite sides thereof in sliding movement within said housing and roller means between said drawer and housing engaging said bars, the forward end of said drawer lying substantially within and forming part of the forward side of said housing in said closed drawer position, said drawer having a portion extending outward of said housing to expose an open top to reecive trash in open drawer position, said open top being covered by said housing in closed drawer position, said drawer having pressure resistant forward, side and bottom plates adjoining each other and integrally forming a rigid compression-resistant chamber in the forward end of said drawer, a movable piston mounted to reciprocate in said housing and compress trash filled in said compression chamber and means for reciprocating said piston.*

References Cited

The following references, cited by the Examiner, are of record in the patented file of this patent or the original patent.

UNITED STATES PATENTS

| | | | |
|---|---|---|---|
| 252,922 | 1/1882 | Bacon | 100—224 X |
| 2,087,435 | 7/1937 | Hubbert | 100—229 X |
| 2,591,510 | 4/1952 | Clark | 100—229 X |
| 2,702,224 | 2/1955 | Goldberg | 312—274 |
| 2,757,603 | 8/1956 | Wilson et al. | 100—229 X |
| 3,353,478 | 11/1967 | Hopkins | 100—52 |
| 2,109,559 | 3/1938 | Wickert | 100—245 X |
| 3,204,550 | 9/1965 | Swiderski et al. | 100—245 X |
| 2,817,290 | 12/1957 | Parker | 100—229 A |
| 3,195,448 | 7/1965 | Larsen et al. | 100—245 |
| 3,228,323 | 1/1966 | Schohl | 100—126 |
| 3,229,618 | 1/1966 | O'Connor | 100—245 X |
| 3,253,537 | 5/1966 | Porter et al. | 100—245 X |
| 3,352,230 | 11/1967 | Hunnicutt | 100—53 |
| 3,358,590 | 12/1967 | Howard | 100—245 X |

BILLY J. WILHITE, Primary Examiner

U.S. Cl. X.R.

53—124; 100—53, 126, 245, 289, 295